US012675383B2

(12) United States Patent
Edwards et al.

(10) Patent No.: US 12,675,383 B2
(45) Date of Patent: *Jul. 7, 2026

(54) SYSTEMS AND METHODS FOR INACTIVITY-BASED FAILURE TO COMPLETE TASK NOTIFICATIONS

(71) Applicant: Capital One Services, LLC, McLean, VA (US)

(72) Inventors: Joshua Edwards, Philadelphia, PA (US); Kathryn Tikoian, South Orange, NJ (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,392

(22) Filed: Jul. 2, 2024

(65) Prior Publication Data

US 2024/0354214 A1      Oct. 24, 2024

Related U.S. Application Data

(63) Continuation of application No. 17/659,525, filed on Apr. 18, 2022, now Pat. No. 12,056,036.

(51) Int. Cl.
*G06F 11/34* (2006.01)
*G06F 11/30* (2006.01)
(Continued)

(52) U.S. Cl.
CPC ........ *G06F 11/3438* (2013.01); *G06F 11/302* (2013.01); *G06F 11/328* (2013.01); *G06N 5/025* (2013.01)

(58) Field of Classification Search
CPC .. G06F 11/3438; G06F 11/302; G06F 11/328; G06N 5/025; G06N 20/00
See application file for complete search history.

(56) References Cited

U.S. PATENT DOCUMENTS 10,546,299 B1 * 1/2020 Garner, IV ............. G06Q 20/40
10,924,445 B2   2/2021 Ratiu et al.
(Continued)

OTHER PUBLICATIONS

Riss et al., Email in Semantic Task Management, 2009 IEEE Conference on CEC, Vienna, Austria, p. 468-475. (Year: 2009).*
(Continued)

*Primary Examiner* — Patrice L Winder
(74) *Attorney, Agent, or Firm* — Bookoff McAndrews, PLLC

(57) ABSTRACT

Disclosed are methods and systems for inactivity-based prompting of task completion. For instance, a task related to an account may be identified as an incomplete task along with a task status related to the task as incomplete. The task and task status may be stored in a data store in association with an account identifier. In response to receiving a session inactivity indication for an account session established via an application executing on a user computing device, the data store may be queried using the account identifier to determine the task status for the task. The task status may be determined as remaining incomplete, and a notification indicating the incompletion may be generated. Additionally, a communication channel may be determined for transmission of the notification that increases a likelihood of notification engagement to prompt completion of the task. The notification may be transmitted via the communication channel.

20 Claims, 6 Drawing Sheets

(51) Int. Cl.
      *G06F 11/32*       (2006.01)
      *G06N 5/025*       (2023.01)

(56)               References Cited

U.S. PATENT DOCUMENTS

| | | |
|---|---|---|
| 2006/0080619 A1 | 4/2006 | Carlson et al. |
| 2009/0094623 A1 | 4/2009 | Chakra et al. |
| 2013/0061091 A1 | 3/2013 | Moore et al. |
| 2016/0335572 A1 | 11/2016 | Bennett et al. |
| 2017/0178048 A1 | 6/2017 | Ghotbi et al. |
| 2018/0052706 A1 | 2/2018 | Agrawal |
| 2018/0197125 A1 | 7/2018 | Standefer, III et al. |
| 2018/0349953 A1 | 12/2018 | Tian et al. |
| 2019/0228766 A1 | 7/2019 | White et al. |
| 2019/0289025 A1* | 9/2019 | Kursun ................. H04L 41/145 |
| 2019/0356750 A1 | 11/2019 | Dotan-Cohen et al. |
| 2019/0394289 A1 | 12/2019 | Lehrian et al. |
| 2020/0125586 A1 | 4/2020 | Rezaeian et al. |
| 2020/0226554 A1 | 7/2020 | Luna |
| 2021/0037101 A1 | 2/2021 | Fleck et al. |
| 2022/0103562 A1 | 3/2022 | Ziembicki et al. |
| 2022/0357977 A1 | 11/2022 | Kalou et al. |
| 2023/0195294 A1 | 6/2023 | Li et al. |

OTHER PUBLICATIONS

Sow et al., SCOUT contextually organizes user task, IEEE ICEBE '05, Beijing China, p. 94-101. (Year: 2005).*
Sow et al., Uncovering the to-dos hidden in your in-box, IBM Systems Journal, vol. 45, No. 4, p. 739-757. (Year: 2006).*

\* cited by examiner

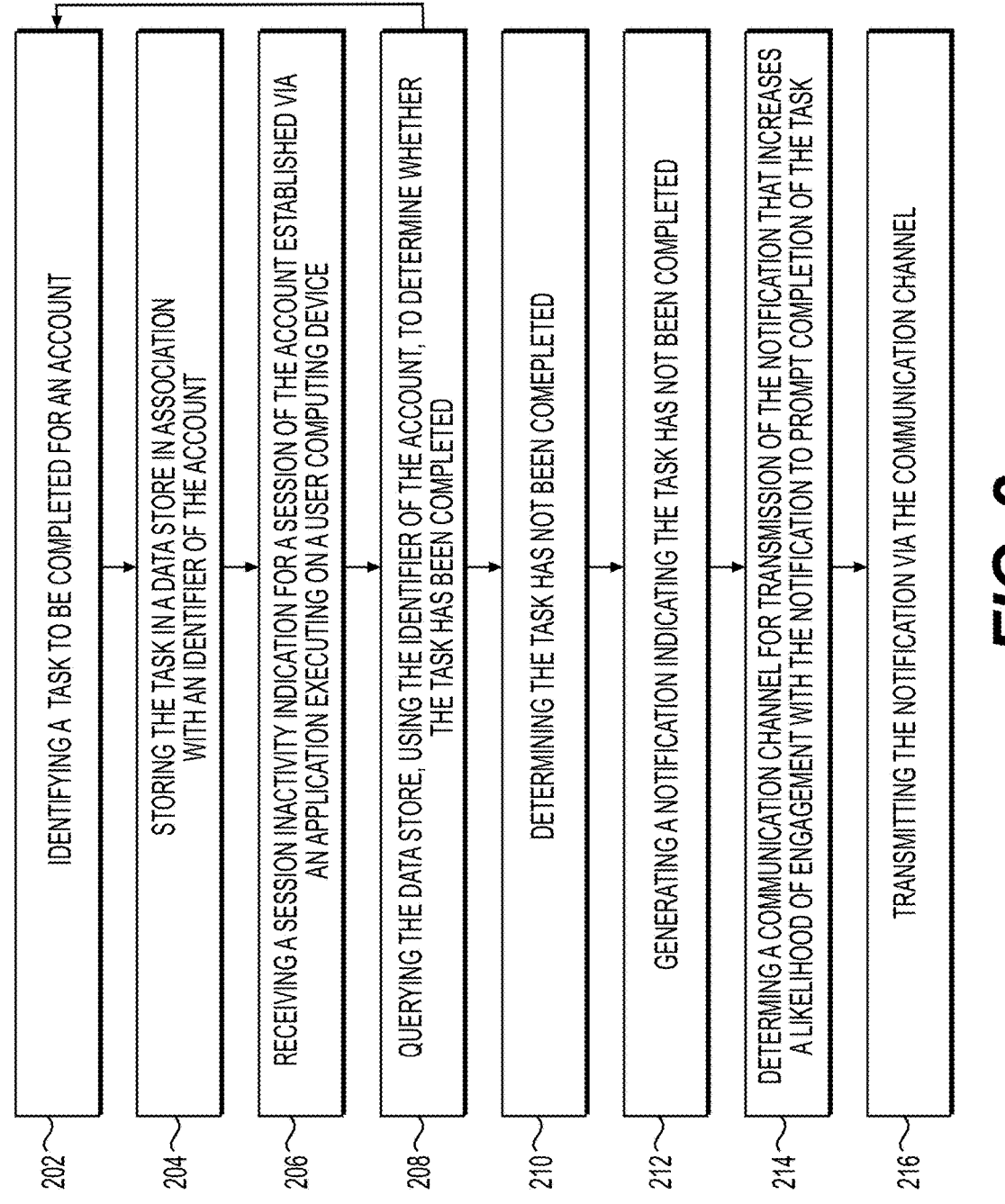

200

202 — IDENTIFYING A TASK TO BE COMPLETED FOR AN ACCOUNT

204 — STORING THE TASK IN A DATA STORE IN ASSOCIATION WITH AN IDENTIFIER OF THE ACCOUNT

206 — RECEIVING A SESSION INACTIVITY INDICATION FOR A SESSION OF THE ACCOUNT ESTABLISHED VIA AN APPLICATION EXECUTING ON A USER COMPUTING DEVICE

208 — QUERYING THE DATA STORE, USING THE IDENTIFIER OF THE ACCOUNT, TO DETERMINE WHETHER THE TASK HAS BEEN COMPLETED

210 — DETERMINING THE TASK HAS NOT BEEN COMEPLETED

212 — GENERATING A NOTIFICATION INDICATING THE TASK HAS NOT BEEN COMPLETED

214 — DETERMINING A COMMUNICATION CHANNEL FOR TRANSMISSION OF THE NOTIFICATION THAT INCREASES A LIKELIHOOD OF ENGAGEMENT WITH THE NOTIFICATION TO PROMPT COMPLETION OF THE TASK

216 — TRANSMITTING THE NOTIFICATION VIA THE COMMUNICATION CHANNEL

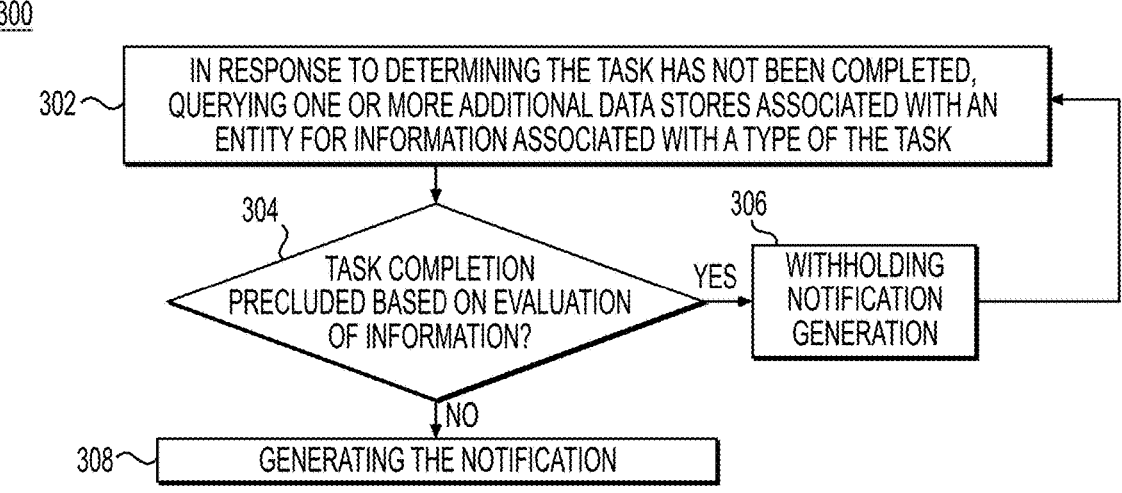

302 ~ IN RESPONSE TO DETERMINING THE TASK HAS NOT BEEN COMPLETED, QUERYING ONE OR MORE ADDITIONAL DATA STORES ASSOCIATED WITH AN ENTITY FOR INFORMATION ASSOCIATED WITH A TYPE OF THE TASK

304
TASK COMPLETION PRECLUDED BASED ON EVALUATION OF INFORMATION?

306
YES → WITHHOLDING NOTIFICATION GENERATION

NO

308 ~ GENERATING THE NOTIFICATION

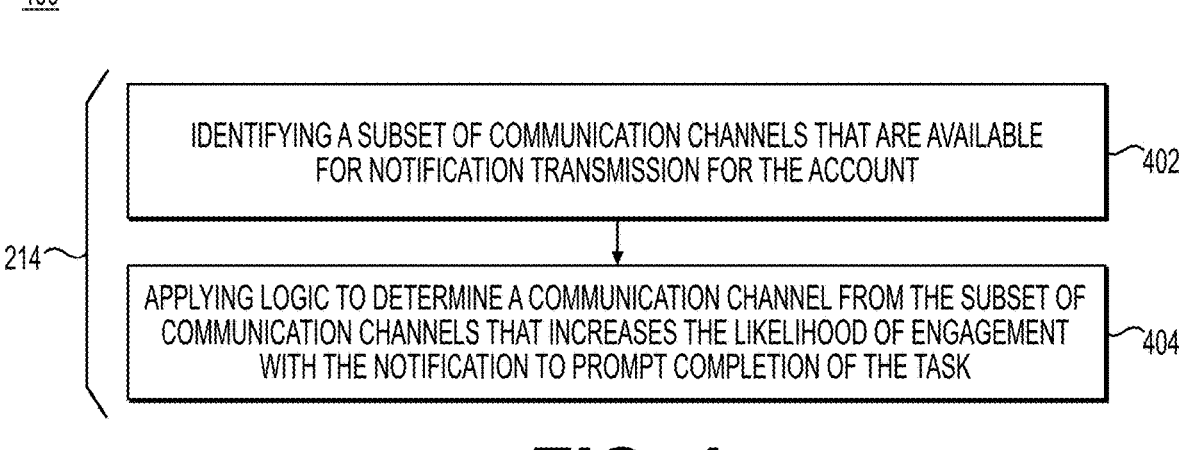

214 ~

IDENTIFYING A SUBSET OF COMMUNICATION CHANNELS THAT ARE AVAILABLE FOR NOTIFICATION TRANSMISSION FOR THE ACCOUNT — 402

APPLYING LOGIC TO DETERMINE A COMMUNICATION CHANNEL FROM THE SUBSET OF COMMUNICATION CHANNELS THAT INCREASES THE LIKELIHOOD OF ENGAGEMENT WITH THE NOTIFICATION TO PROMPT COMPLETION OF THE TASK — 404

FIG. 4

SYSTEMS AND METHODS FOR INACTIVITY-BASED FAILURE TO COMPLETE TASK NOTIFICATIONS

CROSS-REFERENCE TO RELATED APPLICATION(S)

This patent application is a continuation of and claims the benefit of priority to U.S. Nonprovisional patent application Ser. No. 17/659,525, filed on Apr. 18, 2022, the entirety of which is incorporated herein by reference.

TECHNICAL FIELD

Various embodiments of this disclosure relate generally to techniques for task completion monitoring associated with an application account session, and, more particularly, to systems and methods for generating a notification for a task determined to be incomplete responsive to detecting inactivity of the application account session to prompt task completion.

BACKGROUND

Account services providers typically rely on account users to perform various tasks related to their account. In some circumstances, these tasks may be time sensitive. For example, the task may need to be performed by a certain date or within a predefined time period. When a user is logged into and interacting with an account services system, the user may be presented with a notification to complete a given task. Once this notification has been read by the user, it may be marked as resolved even if the task that triggered the notification has not been completed. If the user logs out of the system without completing the task, the likelihood that the task falls out of the user's mind and the user fails to timely complete the task significantly increases. Depending on the task, failure to complete the task may lead to significant negative impacts to the account and/or user and result in additional time the user may spend with service agents of the provider to remedy the task completion failure.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for task completion monitoring associated with an application account session. The methods and systems may enable generation of a notification for a task determined to be incomplete responsive to detecting inactivity of the application account session to prompt task completion.

For instance, a computer-implemented method for inactivity-based prompting of task completion may include identifying a task related to an account as an incomplete task and a task status related to the task as incomplete, storing the task and the task status in a data store in association with an account identifier, and receiving a session inactivity indication for an account session established via an application executing on a user computing device. The method may also include querying the data store, using the account identifier, to determine the task status for the task in response to receiving the session inactivity indication, and determining the task status remains incomplete. The method may further include generating a notification indicating the task is incomplete, determining a communication channel for transmission of the notification that increases a likelihood of notification engagement to prompt task completion, and transmitting the notification via the communication channel.

A system for inactivity-based prompting of task completion may include at least one memory storing instructions, and at least one processor operatively connected to the at least one memory and configured to execute the instructions to perform operations. The operations may include identifying a task related to an account as an incomplete task and a task status related to the task as incomplete, storing the task and the task status in a data store in association with an account identifier, and receiving a session inactivity indication for an account session established via an application executing on a user computing device. The operations may also include querying the data store, using the account identifier, to determine the task status for the task in response to receiving the session inactivity indication, and determining the task status remains incomplete. The operations may further include generating a notification indicating the task is incomplete, determining a communication channel for transmission of the notification that increases a likelihood of notification engagement to prompt task completion, and transmitting the notification via the communication channel.

A computer-implemented method for inactivity-based prompting of task completion may include identifying a task related to an account as an incomplete task and a task status related to the task as incomplete, storing the task and the task status in a data store in association with an account identifier, and receiving a session inactivity indication for an account session established via an application executing on a user computing device. The method may also include querying the data store, using the account identifier, to determine the task status for the task remains incomplete in response to receiving the session inactivity indication, and determining the task status remains incomplete. The method may further include generating a notification indicating the task is incomplete, determining a communication channel for transmission of the notification that increases a likelihood of notification engagement to prompt task completion by identifying a subset of communication channels that are available for notification transmission for the account, and applying logic to determine the communication channel from the subset of communication channels, where at least a portion of the logic is based on at least one of a type of the application used to establish the account session, a session status of the account session, or historical notification engagement data associated with one or more accounts, and transmitting the notification via the communication channel.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of an exemplary process for inactivity-based prompting of task completion, according to certain embodiments.

FIG. 3 depicts a flowchart of an exemplary process for determining whether to withhold generation of a failure to complete task notification, according to certain embodiments.

FIG. 4 depicts a flowchart of an exemplary process for determining a communication channel for notification transmission, according to certain embodiments.

DETAILED DESCRIPTION OF EMBODIMENTS

Figure 1:
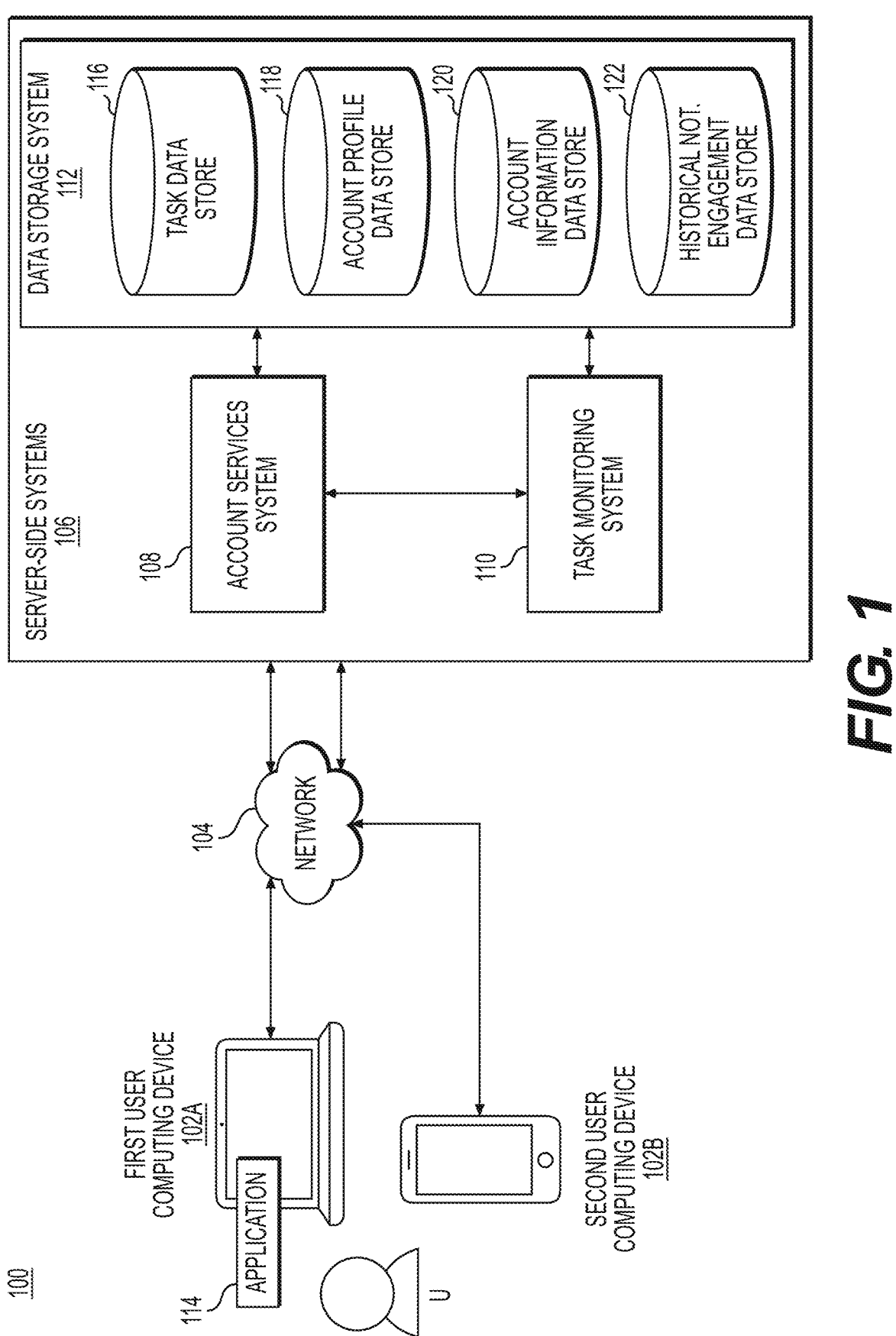
FIG. 1 depicts an exemplary environment for task completion monitoring, according to certain embodiments.

According to certain aspects of the disclosure, methods and systems are disclosed for inactivity-based task completion monitoring associated with an application account session.

As will be discussed in more detail below, in various embodiments, systems and methods are described for generating and transmitting a notification to prompt task completion in real or near real-time upon detecting inactivity of an application account session and at least one outstanding, incomplete task related to the account. The immediate generation and transmission of the notification upon detecting the session inactivity may capture the account user while they are still in a mindset to perform account-related (but not necessarily session-related) tasks, and thus increase a likelihood of task completion. Additionally, a communication channel for transmission of the notification that increases a likelihood of engagement with the notification may be determined to further prompt task completion.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of +10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "account user" "user" or "individual" generally encompass any person or entity that may have an account and consume account services from a provider (e.g., through an application). The term "application" may be used interchangeably with other terms like "program," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

In an exemplary use case, certain embodiments may enable session inactivity-based generation and transmission of failure to complete task notifications through optimal communication channels. For example, a user having an account and consuming account services from a provider may log in to their account via an application executing on the user's device, and an account session may be established. In some examples, a task to be completed for the account (i.e., an incomplete task) may be identified prior to, in response to, and/or subsequent to the login. The task may be associated with a predefined time period or deadline for completion. Example tasks may include changing an account setting, such as a password before it expires, making a payment related to the account on or before the due date to avoid late payment fees, signing documents, forms, or other similar paperwork by a deadline, such as a tax deadline, or to allow a process to move forward, such as a loan application process, and/or the like.

In response to receiving an indication of the account session becoming inactive, and determining the task remains incomplete, a notification indicating the task has not been completed or is incomplete may be generated and transmitted to the user in real—or near real-time. Additionally, the second notification may be transmitted via a communication channel that is determined to increase a likelihood of engagement with the notification to prompt completion of the task (e.g., transmitted via an optimal communication channel). By sending the notification via an optimal communication channel in real—or near real-time, the notification may reach the user while they are still in the mindset to be performing tasks related to the account. For example, if the account is a financial account, and the user has just been navigating through the associated application during the session (e.g., viewing financial account details), the notification may reach the user while they are in that financial mindset to complete financial account-related tasks.

However, in some instances, there may be a reason not to prompt completion of the task, and if so, the generation of the notification may be at least temporarily withheld. For example, depending on an account type and task type, it may not be practical to complete the task at the time the session inactivity is detected. Continuing the above example, if the account type is a financial account and the task type is a payment due using funds from the financial account but those funds are insufficient, it may be more practical to withhold the notification (e.g., at least until the funds are no longer insufficient) to prevent an overdraft.

While the specific examples included throughout the present disclosure involve financial services, it should be understood that techniques according to this disclosure may be adapted to other types of user account services. For example, the techniques may be adapted to any service for which a user creates an account accessible by an application to consume services and the account includes associated tasks having predefined time periods or deadlines for completion, such as the changing of account settings and/or submission (digitally or otherwise) of items, such as documents, files, forms, payments and/or the like. It should also be understood that the examples above are illustrative only. The techniques and technologies of this disclosure may be adapted to any suitable activity.

Presented below are various aspects of machine learning techniques that may be adapted for determining an optimal communication channel for transmission of the notification (e.g., a channel that increases a likelihood of engagement with the notification). As will be discussed in more detail below, the machine learning techniques may include one or more aspects according to this disclosure, e.g., a particular selection of training data, a particular training process for the machine learning system, operation of the machine learning system in conjunction with particular data, modification of such particular data by the machine learning system, etc., and/or other aspects that may be apparent to one of ordinary skill in the art based on this disclosure.

FIG. 1 depicts an exemplary environment 100 for task completion monitoring, according to certain embodiments, and which may be used with the techniques presented herein. A first user computing device 102A and a second user computing device 102B, collectively user computing device(s) 102, may communicate with one or more of the other components of the environment 100 across electronic network 104, including one or more server-side systems 106 associated with a provider, discussed below. The user computing device(s) 102 may be associated with a user, U, having an account and consuming account services of the provider.

The server-side systems 106 may include an account services system 108, a task monitoring system 110, and/or a data storage system 112, among other systems. In some embodiments, the account services system 108, the task monitoring system 110, and the data storage system 112 may be associated with a common entity, e.g., the account services provider, or the like. In such embodiments, the account services system 108, task monitoring system 110, and/or data storage system 112 may be part of a cloud service computer system (e.g., in a data center). In other embodiments, one or more of the components of the environment 100 may be associated with a different entity than another. For example, the task monitoring system 110 may be associated with a third party that provides task completion monitoring services to the account services provider and/or the data storage system 112 may be associated with a same or different third party that provides data storage services to the account services provider. The systems and devices of the environment 100 may communicate in any arrangement. As will be discussed herein, systems and/or devices of the environment 100 may communicate in order to enable session inactivity-based generation and transmission of notifications to prompt task completion, among other activities.

The user computing device(s) 102 may be configured to enable the user U to access and/or interact with other systems in the environment 100. For example, the user computing device(s) 102 may be a computer system such as, for example, a desktop computer, a laptop computer, a tablet, a smart cellular phone, a smart watch or other electronic wearable, etc. As shown, the first user computing device 102A may be a laptop computer and the second user computing device 102B may be a smart cell phone. In some embodiments, the user computing device(s) 102 may include one or more electronic application(s), e.g., a program, plugin, browser extension, etc., installed on a memory of the user computing device(s) 102. In some embodiments, the electronic application(s) may be associated with one or more of the other components in the environment 100. For example, the electronic application(s) may include one or more of system control software, system monitoring software, software development tools, etc. As shown in FIG. 1, at least a portion of one or more instructions stored in a memory of the first user computing device 102A may be associated with an application 114 that is configured to communicate with one or more of the server-side systems 106. For example, the application 114 may be executed on the first user computing device 102A to establish a session for the account of the user U via the account services system 108 (e.g., utilizing services provided by the account services system 108). In some examples, instructions associated with the application 114 may also be stored in a memory of the second user computing device 102B. In some examples, the application 114 may be a thick client application that is installed locally on the user computing device(s) 102 (e.g., a desktop application or mobile application). In other examples, the application 114 may be a thin client application (e.g., a web application) that is rendered via a web browser launched on the user computing device(s) 102.

Additionally, one or more components of the user computing device(s) 102 may generate, or may cause to be generated, one or more graphic user interfaces (GUIs) based on instructions/information stored in the memory, instructions/information received from the other systems in the environment 100, and/or the like and may cause the GUIs to be displayed via a display of the user computing device(s) 102. The GUIs may be, e.g., mobile application interfaces or browser user interfaces and may include text, input text boxes, selection controls, and/or the like. The display may include a touch screen or a display with other input systems (e.g., a mouse, keyboard, etc.) for the user U of the user computing device(s) 102 to control the functions of the user computing device(s) 102.

The account services system 108 may include one or more server devices (or other similar computing devices) for executing account services of the provider. For example, through a session for the account established via the application 114 executing on the first user computing device 102A, the account services system 108 may enable the user U to navigate through account details and information, perform account-related tasks, request service assistance from the provider's agents, and/or the like. As one non-limiting example, if the provider is providing financial account services and the user's account with the provider includes one or more banking accounts and a credit card account, the account services system 108 may provide the user with details of each of the financial accounts (e.g., obtained from the data storage system 112 as described below), and allow the user to perform tasks related to an account profile (e.g., update contact information, user preferences, a login password, etc.) and/or the financial accounts (e.g., perform transfer between accounts, submit a payment), among other account activities.

The task monitoring system 110 may include one or more server devices (or other similar computing devices) for executing task completion monitoring services. In some examples, the task monitoring system 110 may be a sub-system or component of the account services system 108 (e.g., when the task monitoring system 110 is also provided by the provider, rather than a third party). As described elsewhere herein, example task completion monitoring services may include identifying one or more tasks to be completed for a given account, storing (and updating a task status of) the tasks in a data store (e.g., within data storage system 112 as described below), and in response to receiving an indication that an application session for the given account has gone inactive and one of the tasks has not yet been completed, triggering generation of a notification and determination of an optimal communication channel for transmission of the notification to prompt task completion.

The data storage system 112 may include a server system or computer-readable memory such as a hard drive, flash drive, disk, etc. In some embodiments, the data storage system 112 includes and/or interacts with an application programming interface for exchanging data to other systems, e.g., one or more of the other components of the environment, such as at least the account services system 108 and the task monitoring system 110. In some examples, the data storage system 112 may be a sub-system or component of the account services system 108 (e.g., when the data storage system 112 is also provided by the provider rather than a third party). The data storage system 112 may include and/or act as a repository or source for various types of account-related data. For example, the data storage system 112 may include a plurality of data stores, including a task data store 116, an account profile data store 118, an account information data store 120, and/or a historical notification engagement data store 122, among other data stores. In some examples, the data stores 116, 118, 120, 122, may store the various types of account-related data in association with an identifier of each account.

The task data store 116 may include information associated with one or more tasks identified for an account and an associated task status for the task(s) (e.g., complete, incomplete, in progress, etc.). The account profile data store 118 may include contact information for the user U, contact and/or application notification preferences of the user U, and/or available communication channels for transmitting notifications to the user U, among other similar information. The account information data store 120 may include details associated with the account. For example, if the account is a financial account, the account information data store 120 may include an account balance. The historical notification engagement data store 122 may include historical notification engagement data associated with one or more of the accounts serviced by the provider and/or other providers (e.g., of accounts of a similar type) having given the provider access to at least their historical notification engagement data.

The network 104 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The user computing device(s) 102 and one or more of the server-side systems 106 may be connected via the network 104, using one or more standard communication protocols. The user computing device(s) 102 and the one or more of the server-side systems 106 may transmit and receive communications from each other across the network 104, as discussed in more detail below.

Although depicted as separate components in FIG. 1, it should be understood that a component or portion of a component in the system of exemplary environment 100 may, in some embodiments, be integrated with or incorporated into one or more other components. For example, the task monitoring system 110 and/or data storage system 112 may be integrated with the account services system 108 or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the user computing device(s) 102, one or more of the server-side systems 106, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 depicts a flowchart of an exemplary process 200 for inactivity-based prompting of task completion, according to certain embodiments. In some examples the process 200 may be performed by the task monitoring system 110. At step 202, the process 200 may include identifying a task (e.g., a currently incomplete task) to be completed for an account. The task may be associated with a predefined time period by which the task is to be completed. One example task type identified may be associated with a changing of a setting of the account, such as a login password for security compliance or a validation of a new electronic mail address added to a profile of the account. Another example task type identified may include a submission of an item associated with the account. The item to be submitted may include a file, a form, a document, a payment, and/or other similar items. The item may be submitted through the application 114 (e.g., a digital or electronic submission). Alternatively, the item may be submitted through other means (e.g., paper submission via mail).

In some examples, the task identified may be related to activities associated with a session for the account that has been established. As one illustrative example, the account may be a financial account provided by a financial institution (e.g., the provider). Among other account services, the financial institution may offer loans or other similar financing for various types of items (e.g., vehicles). A session for the account may be established via the application 114 executing on the first user computing device 102A. In some examples, the user U may provide a login username and password to authenticate the user U and enable establishment of the session (e.g., using session and/or token-based authentication performed by the account services system 108). During the session, the user U may initiate a loan application process. The application process may involve (e.g., as one of the last steps) the uploading of a signed form certifying the information provided in the application process is true. Therefore, upon the user selecting to initiate the loan application process during the session, a task associated with the upload of the signed form may be identified, among other tasks related to the application process.

In other examples, the task may be independent of activities associated with the session. As one illustrative example, in the scenario described above where the User U has initiated the loan application process, another type of task unrelated to (e.g., independent from) the loan application process may be identified. For example, a task to change the login password may be identified.

In some embodiments, the task may be identified prior to the session of the account being established. For example, the task monitoring system 110 may periodically run a check for tasks associated with the account (e.g., independent of a session being established). Additionally, in such examples, a first or initial notification indicating the identified task to be completed may be generated and transmitted to one of the computing device(s) 102, and the establishment of the session may be in response to (e.g., prompted by) the first notification. For example, upon receiving the first notification at one of the computing device(s) 102 indicating that there is an outstanding task to be completed, User U may log in to the account (e.g., via application 114 on the first user computing device 102A) with an intent to complete the outstanding task. To log in the user U may provide credentials, such as a username and password, among other identifiers used to authenticate the user U as part of the login process. The session may be established in response to the authentication of the user U. Additionally, or alternatively, the task may be identified responsive to the session of the account being established via the application 114 executing on the first user computing device 102A. For example, if the first user computing device 102A is a foreign device not previously associated with the account, the establishment of the session on that device may trigger a task for device verification. Additionally, or alternatively, the task may be identified in response to an activity performed by the User U during the session that triggers that task. For example, the user U may enter a new electronic mail address to be associated with the account triggering a task for validating the new address. In the latter examples where the task may be identified at session establishment or the duration thereof, a similar first or initial notification indicating the identified task to be completed may be generated and transmitted to one of computing device(s) 102. In other embodiments, a notification may not be generated and transmitted until the session becomes inactive and/or invalidated and the identified task has yet to be completed, as described below at step 206.

At step 204, the process 200 may include storing the task in a data store in association with an identifier of the account. For example, the task monitoring system 110 may provide instructions that include at least a descriptor for the task (e.g., identifying the task) and the identifier of the account to the task data store 116 (e.g., via an API call). In some examples, the task data store 116 may include one or more tables that store task-related information for a plurality of accounts, each having associated identifiers. Based on the account identifier, the task may be stored among one or more other tasks for the account in the task data store 116. A task status of each task may also be stored (e.g., complete, incomplete, in progress, etc.). As a task for the account is completed, the task data store 116 may be updated to indicate the task has been completed (e.g., by changing the task status). For example, as a task is completed, the task monitoring system 110 may receive a task completion indication as part of a data stream from the application 114. In response to receiving the task completion indication, the task monitoring system 110 may instruct the task data store 116 (e.g., via an API call) to change the task status for the task of the account to complete.

As discussed above, in some examples, an optional step performed before, after, or concurrently with step 204 and prior to step 206 may include generating and transmitting a first notification indicating that the task identified has not been completed.

At step 206, the process 200 may include receiving a session inactivity indication for the session of the account established via the application 114 executing on the user computing device 102 (e.g., first user computing device 102A). In some examples, the task monitoring system 110 may receive the session inactivity indication as part of a data stream transmitted from the application 114 over the network 104 in response to the application 114 detecting one or more events associated with the session. For certain event types, the detection may be dependent on a type of the application 114 (e.g., whether the application 114 is locally installed on the first user computing device 102A or is rendered via a web browser launched on the first user computing device 102A).

One example event may include a manual selection of the user U to log out of the session via the application 114 (e.g., a selection of a log out control element of the application 114). When the user U selects to log out of the session, the application 114 may send a communication (e.g., a logout API request) to the account services system 108. The account services system 108 may then invalidate the session.

Another example event may include a detected lack of activity associated with the application and/or the application losing focus. In some examples, the event may trigger the transmission of the session inactivity indication immediately upon detecting the lack of activity and/or loss of focus. In other examples, the event may trigger the transmission of the session inactivity indication upon detecting the lack of activity and/or loss of focus for a particular period of time. Additionally, in further examples, the particular period of time may be greater than a first threshold period of time of inactivity and less than a second threshold period of time of inactivity associated with an invalidation of the session due to timeout. For example, if application 114 automatically invalidates the session after 10 minutes of inactivity (e.g., the second threshold period of time is 10 minutes), the session inactivity indication may be transmitted upon detecting a lack of activity for 3 minutes. The first threshold period of time may account for common user behavior, such as the shifting of focus between or among activities when more than one activity is being performed at a time. When the application 114 is a locally installed application (e.g., a desktop or mobile application), inactivity may be detected when the application 114 is no longer the active application that the user U is interacting with. For example, the application 114 may remain open, but once a user U opens or shifts focus to another open application locally installed or rendered in a web browser, the application 114 may no longer be the active application (e.g., the application 114 only remains running in the background). When the application 114 is rendered via a web browser (e.g., is a web application opened in a browser tab), inactivity may be detected when focus on the browser tab is lost. For example, focus may be lost when the user U is interacting with other browser tabs (e.g., the browser tab in which the application 114 is open goes inactive), windows of other applications locally installed (e.g., the browser is no longer the active window), and/or the like.

A further example event may include a closing of the application 114. As one example, if locally installed, the application 114 may be manually closed. As another example, if rendered via a browser, the window of the browser may be closed and/or the browser tab in which the application 114 was opened may be closed. Further, the closing of the application 114 may be a result of the first user computing device 102A being powered down or reset. In some examples, as the application 114 is closing, an API notification indicating the closure may be transmitted to the account services system 108 over the network 104.

In response to receiving the session inactivity indication, the process 200 may proceed to step 208, where the data store may be queried, using the identifier of the account, to determine whether the task has been completed (or otherwise remains incomplete). For example, the task monitoring system 110 may query the task data store 116 using the identifier specific to the account to determine any previously identified tasks that have not been completed based on the task statuses of the tasks for the account maintained in the table stored within the task data store 116. At step 210, the process 200 may include determining the task has not been completed, and thus the task remains incomplete (e.g., based on the query performed at step 208). The process may then proceed to step 212. Alternatively, in instances where the task is determined to have been completed and no other tasks identified remain incomplete, the process 200 may return to step 202.

At step 212, the process 200 may include generating a notification indicating the task has not been completed. In examples where a previous notification (e.g., a first or initial notification) to indicate the task has not been completed is generated and transmitted via a communication channel to prompt completion of the task, the notification generated at step 212 may be a re-notification or a second notification that may be transmitted via a same or different communication channel based on a determination made at step 214, described below. In some embodiments, one or more optional steps may be performed between step 210 and 212 for determining whether to withhold the generating of a notification, as described elsewhere herein.

At step 214, the process 200 may include determining a communication channel for transmission of the notification that increases a likelihood of engagement with the notification to prompt completion of the task (e.g., determining an optimal communication channel). Example communication channels may include a push notification of the application 114, an electronic mail, a text message, an instant message, or a phone call to the device on which the inactive session was established via the application 114, such as the first user computing device 102A, and/or another computing device of the user U, such as the second user computing device 102B.

In some embodiments, the determination of the optimal communication channel may be based on one or more levels of information, as described in more detail elsewhere herein. For example, the determination may be based on a subset of communication channels that are available for notification transmission for the account (e.g., based on the communication channel availability information received and/or obtained by the task monitoring system 110 from the account profile data store 118). Additionally, or alternatively, the determination may be based on a predefined communication channel preference provided by the user U for receiving notifications associated with the account (e.g., based on the account profile data received and/or obtained by the task monitoring system 110 from the account profile data store 118). Additionally, or alternatively, the determination may be based on applied logic. As described elsewhere herein, the logic may be rule-based or machine learning-based, where at least a portion of the logic may be based a type of the application 114 used to establish the session (e.g., locally installed or web-based), a session status of the session (e.g., inactive or invalidated), and/or historical notification engagement data associated with one or more accounts. The task monitoring system 110 may receive and/or obtain at least a portion of the historical notification engagement data from the historical notification engagement data store 122.

At step 216, the process 200 may include transmitting the notification via the communication channel. In some examples, once transmitted, user engagement with the notification may be monitored in association with the completion of the task to determine if the communication channel over which the notification transmitted was effective in prompting the user to complete the task and adjust the applied logic accordingly, as described elsewhere herein. Additionally, or alternatively, feedback from monitoring the notification engagement may be used to tailor future notification transmissions for the account (e.g., independent from the logic).

Accordingly, certain embodiments may perform inactivity-based prompting of task completion. The process 200 described above is provided merely as an example, and may include additional, fewer, different, or differently arranged steps than depicted in FIG. 2.

FIG. 3 depicts a flowchart of an exemplary process 300 for determining whether to withhold generation of a failure to complete task notification, according to certain embodiments. In some examples, the process 300 may be performed by the task monitoring system 110. Process 300 may be used to perform at least a portion of an optional step of process 200 (e.g., subsequent to determining the task has not been completed at step 210 and prior to generating a notification at step 212).

In some examples, the account may be associated with an entity, such as the provider of the account services. At step 302, the process 300 may include querying one or more additional data stores associated with the entity, such as account information data store 120, for information associated with a type of the task in response to determining the task has not been completed. As one illustrative example, the entity (e.g., the provider) may be a financial institution, the account may include one or more financial accounts or sub-accounts of the user held by the financial institution, including a checking account, a savings account, and a credit card account, and the incomplete task may be a submission of an item associated with the account. Specifically, the incomplete task may be a payment for the credit card account that will be deducted from one of the checking and/or savings accounts. In response to determining that the payment has not been submitted upon receiving a session inactivity indication, the task monitoring system 110 may query the account information data store 120 to receive an amount due for the credit card account and a balance of one or more of the checking account and the savings account.

At decision step 304, the process 300 may include evaluating the information to determine whether completion of the task is precluded (e.g., precluded at least temporarily based on information at time of evaluation). In some examples, completion of the task may be precluded when performance of the task may negatively impact the account. When completion of the task is determined to be precluded at decision step 304, the process 300 may proceed to step 306, where the notification generation is withheld. The process may then return to step 302 after a predefined waiting period, for example. Otherwise, when completion of the task is determined not to be precluded at decision step 304, the process may proceed to step 308 where the notification may be generated.

Continuing the above illustrative example, the amount due for the credit card account may be compared to the balance of the checking account and/or savings account as part of the evaluation process at decision step 304 to determine whether the checking account and/or savings account have sufficient balance to cover the amount due (e.g., the balance is at least equal to or greater than the amount due). If the balance of the checking account and/or savings account is insufficient, completion of the task may negatively impact the account of the user by resulting in an overdraft, and thus completion of the task may be at least temporarily precluded (e.g., the process 300 proceeds to step 306). Otherwise, if the balance of the checking account and/or savings account is sufficient, the notification may be generated (e.g., the process 300 proceeds to step 306).

In some embodiments, the evaluation process at decision step 304 may also take into consideration previously authorized withdrawal transactions associated with one or more of the checking and/or savings accounts (e.g., consider repeat or recurring transactions that may be pre-authorized) when determining whether there are sufficient funds available to pay the amount due on the credit card account. In an example scenario, the amount due for the credit card account is $1000 and the balance of the checking account is $2500, but the user U has already authorized a mortgage payment of $2000 to be withdrawn from the checking account (e.g., has allowed or opted in to automatic recurring payments from the checking account) that is scheduled to be completed within a given time period. In such a scenario, the evaluation process may determine that, although there are currently sufficient checking account funds available to pay the amount due, the notification generation may nonetheless be withheld (at least temporarily) to prevent a potential overdraft when the mortgage payment is automatically withdrawn from the checking account.

Additionally, or alternatively, the evaluation process at decision step 304 may take into consideration predicted withdrawal transactions associated with one or more of the checking and/or savings accounts (e.g., transactions that have not been explicitly pre-authorized) when determining whether there are sufficient funds available to pay the amount due on the credit card account. In an example scenario, based on information obtained from the account information data store 120 indicating a withdrawal from the checking account of a given amount for a media streaming service has occurred repeatedly on an approximate date each month for the past two months, a similar withdrawal may be predicted to occur around the approximate date in the present month. If the approximate date falls within a time period relevant to completion of the task, the given amount may be subtracted from the checking account balance prior to determining whether the funds are sufficient.

Similarly, the evaluation process at decision step 304 may also take into consideration predicted deposit transactions to one or more of the checking and/or savings accounts when determining whether there are sufficient funds available to pay the amount due on the credit card account. In an example scenario, based on information obtained from the account information data store 120 indicating a paycheck of a given amount has been deposited to the checking account on an approximate date each month for the past six months, a similar paycheck of the given amount may be predicted to be deposited around the approximate date in the present month. If the approximate date on which the deposit may occur is prior to the due date for the payment, the given amount may be added to the checking account balance prior to determining whether the funds are sufficient. In such an example, if the funds are sufficient but only with the addition of the given amount of the paycheck, the notification may be generated but not transmitted until the date of the paycheck deposit.

In some embodiments, a machine learning model may be applied to perform the predictions in the above-described examples. The machine learning model may be run by the task monitoring system 110, account services system 108, and/or another system associated with the entity (e.g., the provider).

Additionally, or alternatively, the evaluation process at decision step 304 may further take into consideration user preferences defined for the account for the user U. For example, the user U may indicate an account preference to only retrieve funds for bill payment purposes from the checking account. Therefore, if based on the evaluation, there are sufficient funds spread across both the checking and savings accounts to cover the amount due on the credit card but not enough in the checking account alone, the notification generation may nonetheless be withheld (at least temporarily) based on the user preference.

Accordingly, certain embodiments may perform a determination of whether to withhold generation of a failure to complete task notification. The process 300 described above is provided merely as an example, and may include additional, fewer, different, or differently arranged steps than depicted in FIG. 3.

FIG. 4 depicts a flowchart of an exemplary process 400 for determining a communication channel for notification transmission, according to certain embodiments. In some examples, the process 400 may be performed by the task monitoring system 110. Process 400 may be used to perform at least a portion of step 214 of process 200 to determine the communication channel for transmission of the notification that increases a likelihood of engagement with the notification to prompt completion of the task (e.g., to determine the optimal communication channel).

At step 402, process 400 may include identifying a subset of communication channels that are available for notification transmission for the account. For example, the task monitoring system 110 may query, look-up, or otherwise reference data for the account (e.g., data stored in the account profile data store 118) that may indicate what communication channels are available to the account. Example communication channels from which the subset may be identified include a push notification of the application 114, an electronic mail, a text message, an instant message, a phone call, and/or the like. In some examples, availability may be based on whether the user U has installed a local version of the application 114 on one of the user computing device(s). For example, if no local version is installed a push notification of the application 114 may be unavailable. Additionally, or alternatively, availability may be based on permissions provided by the user U (e.g., via settings of the account). As one example, the user U may opt out from receiving text messages, and thus, text messages may be an unavailable communication channel for the account.

At step 404, process 400 may include applying logic to determine a communication channel from the subset of communication channels. At least a portion of the logic may be based on a type of the application used to establish the session (e.g., local application vs. web application). Additionally, or alternatively, at least a portion of the logic may be based on a session status of the session (e.g., inactive vs. invalidated due to manual logout or timeout). Additionally, or alternatively, at least a portion of the logic may be based on historical notification engagement data associated with one or more accounts. The historical notification engagement data may be associated with the present account (e.g., account of the user U). Additionally, or alternatively, the historical notification engagement data may be associated with a plurality of other accounts (e.g., accounts of other users). In some examples, at least a portion of the historical notification engagement data may be received or obtained from the historical notification engagement data store 122. The historical notification engagement data for a given account may include, for a given notification transmitted, a type of account, a type of the application used to establish a session (the inactivity of which triggered the notification transmission), a session status of the session when the notification was transmitted, a type of the task determined to be incomplete, a communication channel used for notification transmission, whether the communication channel was indicated as a user-preferred communication channel, duration from the notification transmission to an interaction with the notification, a duration from the notification transmission to the task completion, and/or the like. In addition to user-preference-related data, the historical notification engagement data for the given account may also include other account profile-specific details, such as demographic data of the account user. In other examples, account user demographic data may be separately accounted for in the logic additionally or alternatively to the historical notification engagement data. One aspect of demographic data on which the logic may be based may include an age of the account user given a likelihood of certain age ranges of account users to interact more responsively with a text message versus a phone call, for example. In some embodiments, the account user may opt in or out to control whether their demographic data may be used for these or other purposes by the entity (e.g., the provider).

In some examples, the logic applied may be rule-based logic. For example, an exemplary rule may state that if a user establishes the session via a local application executing on a given device, and a push notification via the application is an available communication channel, the notification is to be transmitted as a push notification via the application on the given device. Another exemplary rule may state that if a user establishes the session via a web application executing on a given device, the session is invalidated (e.g., based on either a timeout or manual log out), and text message is an available communication channel, the notification may be transmitted as a text message to a device associated with the account that is able to receive text messages (e.g., second user computing device 102B).

In other examples, the logic applied may be machine learning-based logic. For example, a machine learning model may be trained and implemented to predict a communication channel that increases a likelihood of engagement with the notification to prompt task completion, as described elsewhere herein. In examples where the logic applied may be machine learning-based logic, step 402 may be optional (e.g., the available communication channels may be included as optional input data) and/or performed after the prediction is output (e.g., to verify that the predicted communication is an available communication channel for notification transmission).

In some examples, after the notification is transmitted via the communication channel determined at step 404, user engagement with the notification may be monitored in association with completion of the task (e.g., to determine an efficacy of the notification in prompting the user to complete the task). The logic may be updated based on the monitoring to improve an accuracy of future determinations to ensure the most optimal communication channels are utilized for notifications. Additionally, or alternatively, feedback from monitoring the notification engagement may be used to tailor future notification transmissions for the account (e.g., independent from the logic). For example, for a majority of accounts, notification engagement may be highest when the notification is provided as a push notification via the application. However, for the given account, the user U responds to complete tasks more promptly via electronic mail notifications. In such an example, future notification transmissions for the given account may be tailored as electronic mail address notifications (even though this goes against the logic associated with the majority of the accounts). Such tailoring may include storing electronic mail as an optimal communication channel for the account (e.g., in account profile data store 118) to enable subsequent reference thereto when generating and transmitting future notifications.

In other embodiments, when the user U has indicated a preferred communication channel for notifications (and has provided permissions to use said communication channel), this preference may be the communication channel via which notification is sent and the process 400 may be bypassed. Such user preferences may be received and/or obtained by the task monitoring system 110 from the account profile data store 118, for example.

Accordingly, certain embodiments may perform a determination of a communication channel for notification transmission. The process 400 described above is provided merely as an example, and may include additional, fewer, different, or differently arranged steps than depicted in FIG. 4.

Figure 5:
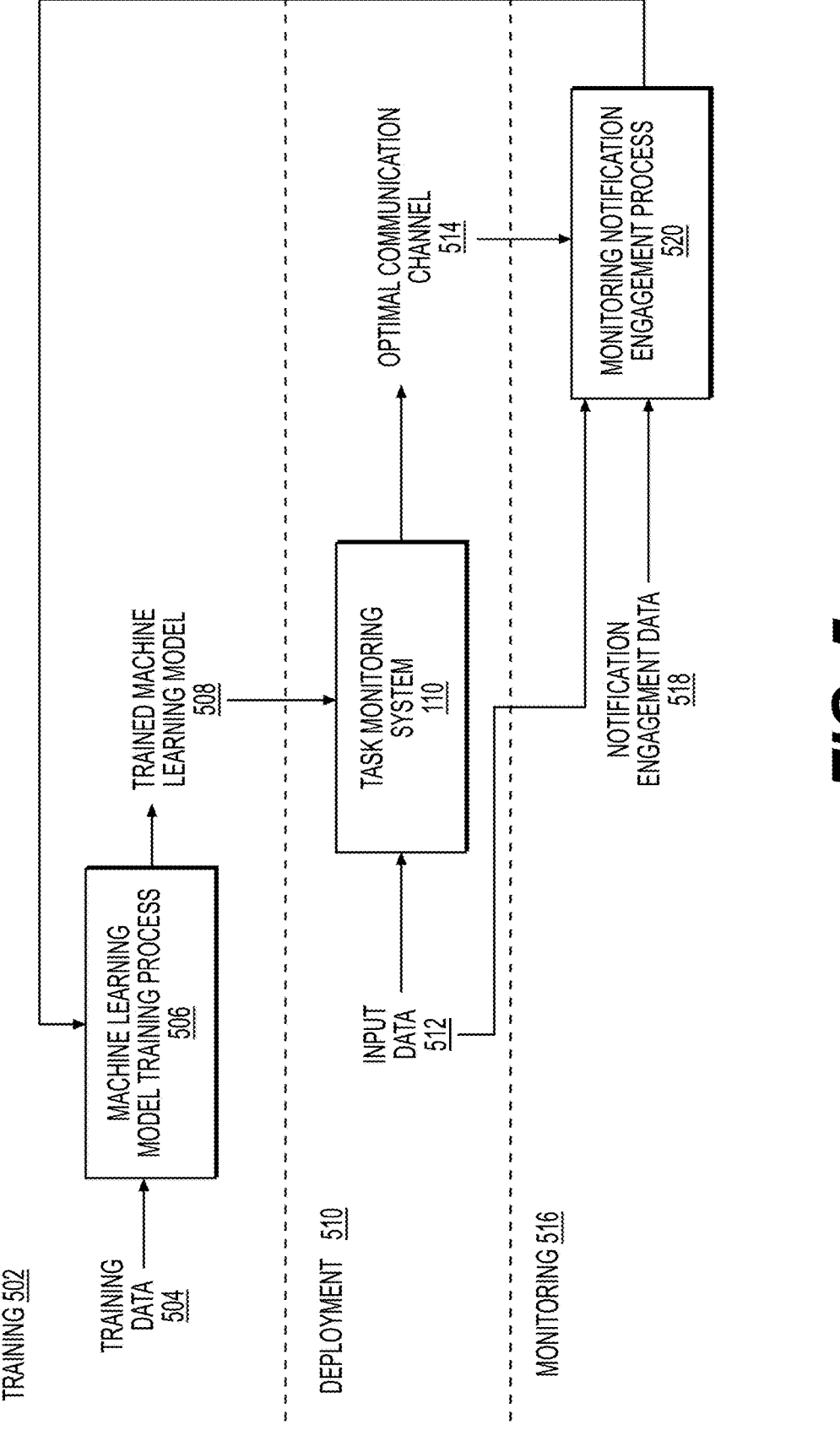
FIG. 5 depicts a block diagram of an exemplary process for training and using a machine learning model to determine a communication channel for notification transmission, according to certain embodiments.

FIG. 5 depicts a block diagram of an exemplary process 500 for training and using a machine learning model to determine a communication channel for notification transmission, according to certain embodiments. In some embodiments, the task monitoring system 110 may one or more of generate, store, train, or use a machine learning model configured to determine an optimal communication channel for notification transmission. The task monitoring system 110 may include a machine learning model and/or instructions associated with the machine learning model, e.g., instructions for generating a machine learning model, training the machine learning model, using the machine learning model, etc. In other embodiments, a system or device other than the task monitoring system 110 may be used to generate and/or train the machine learning model. For example, such a system may include instructions for generating the machine learning model and the training data, and/or instructions for training the machine learning model. A resulting trained-machine learning model may then be provided to the task monitoring system 110 for use.

As depicted in FIG. 5, in some examples, the process 500 may include a training phase 502, a deployment phase 510, and a monitoring phase 516. In the training phase 502, at step 506, the process 500 may include receiving and processing training data 504 to generate (e.g., build) a trained machine learning model 508 for predicting a communication channel for transmission of a notification that increases a likelihood of engagement with the notification to prompt task completion (e.g., for predicting an optimal communication channel).

The training data 504 may include historical notification engagement data associated with a plurality of accounts. The accounts may include accounts of other users and/or the account of the user. The training data 504 may be generated, received, or otherwise obtained from internal and/or external resources. For example, the training data 504 may include historical notification engagement data associated with one or more accounts provided by the provider, the data being collected and stored internally by the provider (e.g., in historical notification engagement data store 122). Additionally, or alternatively, the training data 504 may include historical notification engagement data associated with one or more accounts provided by a third party (e.g., a different entity than the provider) that allows the provider access to their data. In such examples, the accounts provided by the third party may be of a similar type to the accounts provided by the provider. In some examples, historical notification engagement data for an account may include, for a given notification transmitted, a type of account, a type of the application used to establish a session (the inactivity of which triggered the notification transmission), a session status of the session when the notification was transmitted, a type of the task determined to be incomplete, a communication channel used for notification transmission, available communication channels for the account, whether the communication channel was indicated as a user-preferred communication channel, duration from the notification transmission to an interaction with the notification, a duration from the notification transmission to the task completion, and/or the like.

Generally, a model includes a set of variables, e.g., nodes, neurons, filters, etc., that are tuned, e.g., weighted or biased, to different values via the application of the training data 504. In some examples, the training process at step 506 may employ supervised, unsupervised, semi-supervised, and/or reinforcement learning processes to train the model (e.g., to result in trained machine learning model 508). In some embodiments, a portion of the training data 504 may be withheld during training and/or used to validate the trained machine learning model 508.

When supervised learning processes are employed, labels or scores corresponding to the historical engagement data (e.g., labels or scores corresponding to the training data) may facilitate the learning process by providing a ground truth. For example, the labels or scores may indicate the optimal communication channel for notification transmission. Training may proceed by feeding historical notification engagement data for a given notification (e.g., a sample) from the training data into the model, the model having variables set at initialized values, e.g., at random, based on Gaussian noise, a pre-trained model, or the like. The model may output a predicted optimal communication channel for the sample. The output may be compared with the corresponding label or score (e.g., the ground truth) to determine an error, which may then be back-propagated through the model to adjust the values of the variables. This process may be repeated for a plurality of samples at least until a determined loss or error is below a predefined threshold. In some examples, some of the training data 504 may be withheld and used to further validate or test the trained machine learning model 508.

For unsupervised learning processes, the training data 504 may not include pre-assigned labels or scores to aid the learning process. Rather, unsupervised learning processes may include clustering, classification, or the like to identify naturally occurring patterns in the training data 504. K-means clustering or K-Nearest Neighbors may also be used, which may be supervised or unsupervised. Combinations of K-Nearest Neighbors and an unsupervised cluster technique may also be used. For semi-supervised learning, a combination of training data 504 with pre-assigned labels or scores and training data 504 without pre-assigned labels or scores may be used to train the model.

When reinforcement learning is employed, an agent (e.g., an algorithm) may be trained to make a decision regarding the optimal communication channel for the sample from the training data 504 through trial and error. For example, upon making a decision, the agent may then receive feedback (e.g., a positive reward if the predicted optimal communication channel was a channel that the notification was transmitted to and interacted with via that channel), adjust its next decision to maximize the reward, and repeat until a loss function is optimized.

Once trained, the trained machine learning model 508 may be stored and subsequently applied by the task monitoring system 110 during the deployment phase 510. For example, during the deployment phase 510, the trained machine learning model 508 executed by the task monitoring system 110 may receive input data 512 related to a task determined as not having been completed. The input data 512 may include a type of account, a type of the application used to establish a session (the inactivity of which triggered the notification transmission), a session status of the session when the notification was transmitted (e.g., inactive vs. invalidated), a type of the task, available communication channels for the account, and/or any user-preferred communication channels (e.g., retrieved from an account profile). The machine learning model 508 may output a predicted optimal communication channel 514 for transmission of a notification indicating the task has not been completed. The notification may then be transmitted via the predicted optimal communication channel 514 (not shown in FIG. 5).

Subsequent to transmitting the notification via the predicted optimal communication channel 514, notification engagement data 518 may be collected by the task monitoring system 110 during the monitoring phase 516. The notification engagement data 518 may include a duration from the notification transmission to an interaction with the notification, a duration from the notification transmission to the task completion, and/or the like. During process 520, the notification engagement data 518 may be analyzed along with the predicted optimal communication channel 514 and input data 512 to determine an efficacy of the predicted optimal communication channel 514 in prompting task completion. In some examples, based on the analysis, the process 500 may return to the training phase 502, where at step 506 values of one or more variables of the model may be adjusted.

The example process 500 described above is provided merely as an example, and may include additional, fewer, different, or differently arranged aspects than depicted in FIG. 5.

Figure 6:
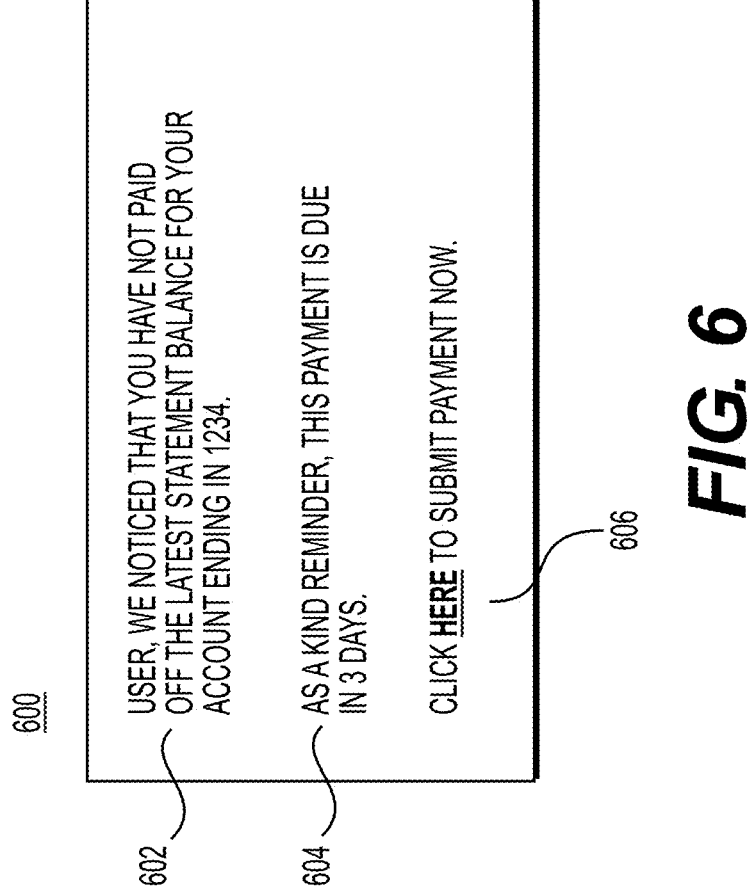
FIG. 6 depicts an exemplary notification to prompt task completion, according to certain embodiments.

FIG. 6 depicts an exemplary notification 600 to prompt task completion, according to certain embodiments. The notification 600 may be received via one of a plurality of communication channels. In some examples, the communication channel may be a determined optimal communication channel to increase a likelihood of engagement with the notification 600 to prompt completion of the task, as described elsewhere herein. Example communication channels via which the notification 600 may be received include a push notification of the application 114, an electronic mail, a text message, an instant message, or a phone call to the first user computing device 102A (e.g., the device on which the session (now inactive) was established via application 114) and/or another user computing device, such as the second user computing device 102B.

The notification 600 may include an incomplete task indicator 602 comprised of text, images, animated graphics and/or the like that indicates a task for the account that has not been completed. In this example notification 600, the task is a submission of a payment associated with the account that is due by a certain date. In other examples, the task may be a submission of any other type of item (e.g., a document, a file, a form, etc.) that may have a predefined time period by which the item is to be submitted (e.g., to meet a deadline or to allow next steps of a process to move forward, etc.). In further examples, the task may be associated with a changing of a setting of the account that may have a predefined time period for completion, such as changing of an online login password by a certain date to be in compliance with security regulations or the like. Accordingly, the notification 600 may also include the predefined time period and/or due date 604 associated with the task.

As previously discussed, in some examples, the submission of the item or changing of the setting may be performed through the application (e.g., a digital or electronic submission). In such examples, the notification may include one or more control elements (e.g., links, buttons, check boxes, radio buttons, etc.) for causing an action to be performed, and information describing the control elements and/or requesting that the user make a selection of one or more of the control elements. For example, the notification may include a link 606 that, upon selection, causes a new session of the application to launch and/or the inactive session to re-activate (e.g., if the application was not closed), where the user may be directly navigated to an appropriate page of the application that allows the user to complete the task (e.g., submit the item or change the setting).

The notification 600 described above is provided merely as an example, and may include additional, fewer, different, or differently arranged information and/or interactive control elements than depicted in FIG. 6.

In general, any process or operation discussed in this disclosure that is understood to be computer-implementable, such as the processes or operations depicted in FIGS. 2-6, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 7:
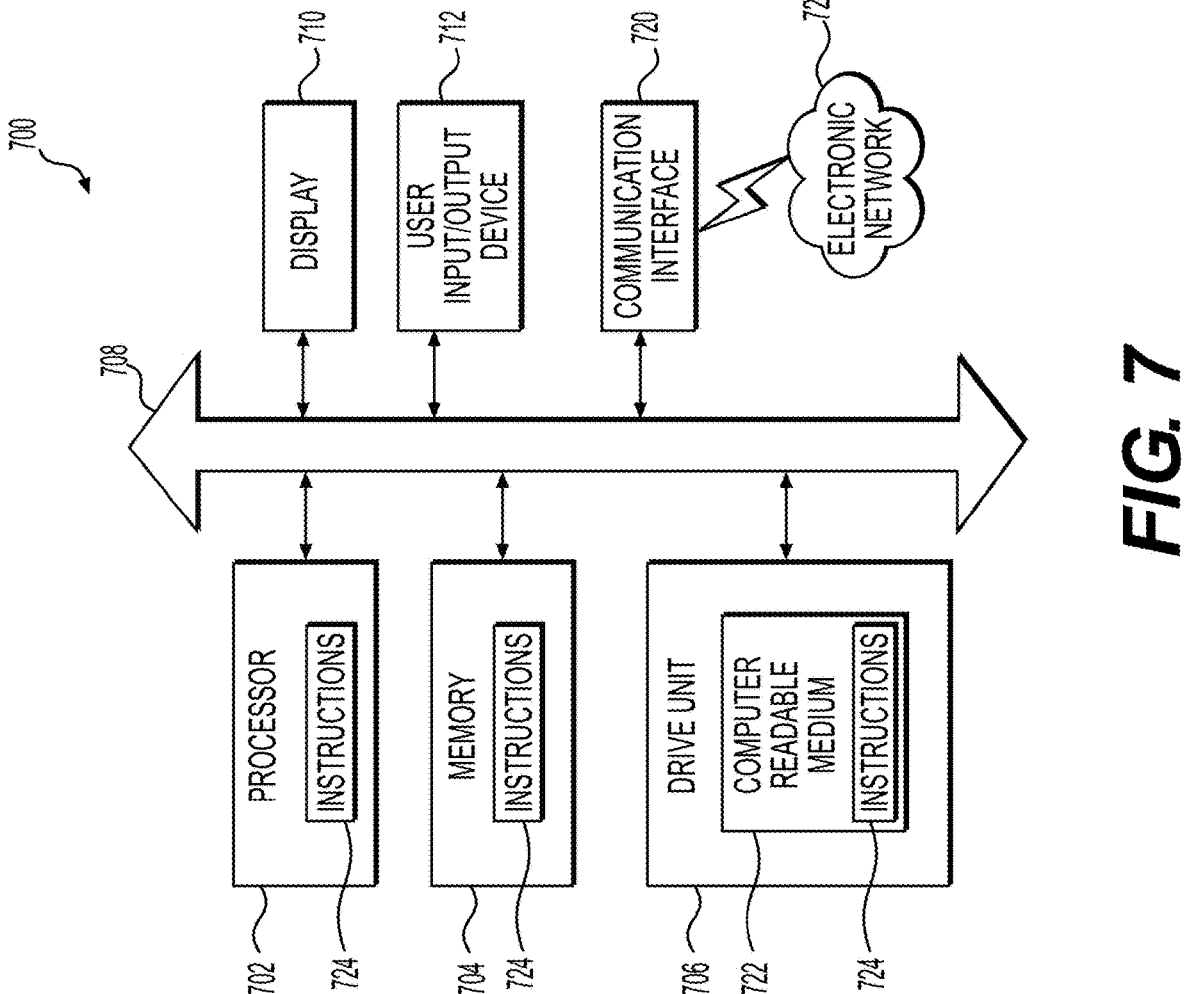
FIG. 7 depicts an example of a computer, according to certain embodiments.

FIG. 7 depicts an example of a computer 700, according to certain embodiments. FIG. 7 is a simplified functional block diagram of a computer 700 that may be configured as a device for executing processes or operations depicted in, or described with respect to, FIGS. 2-6, according to exemplary embodiments of the present disclosure. For example, the computer 700 may be configured as one of the user computing device(s) 102, one of the server-side systems, and/or another device according to exemplary embodiments of this disclosure. In various embodiments, any of the systems herein may be a computer 700 including, e.g., a data communication interface 720 for packet data communication. The computer 700 may communicate with one or more other computers 700 using the electronic network 725. The electronic network 725 may include a wired or wireless network similar to the network 104 depicted in FIG. 1.

The computer 700 also may include a central processing unit ("CPU"), in the form of one or more processors 702, for executing program instructions 724. The program instructions 724 may include instructions for running the application 114 (e.g., if the computer 700 is first user computing device 102A). The program instructions 724 may include instructions for running one or more operation of the server-side systems 106 (e.g., if the computer 700 is a server device or other similar computing device of one or more of the respective server-side systems 106). The computer 700 may include an internal communication bus 708, and a drive unit 706 (such as read-only memory (ROM), hard disk drive (HDD), solid-state disk drive (SDD), etc.) that may store data on a computer readable medium 722, although the computer 700 may receive programming and data via network communications. The computer 700 may also have a memory 704 (such as random access memory (RAM)) storing instructions 724 for executing techniques presented herein, although the instructions 724 may be stored temporarily or permanently within other modules of computer 700 (e.g., processor 702 and/or computer readable medium 722). The computer 700 also may include user input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for activity-based prompting of task completion to determine a communication channel for notification transmission, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for inactivity-based prompting of task completion, comprising:

monitoring a task status of a plurality of tasks related to an account associated with a user;

receiving an inactivity indication for a session established for the user on a user computing device in association with the account;

in response to receiving the inactivity indication for the session, identifying, from the plurality of tasks, a task that is incomplete based on the task status, wherein the task is of a task type;

obtaining information associated with the account;

determining an effect of a completion of the task on the account based on the information and the task type;

determining the completion of the task is not precluded based on the effect; and in response to determining the completion of the task is not precluded, generating and transmitting a notification indicating the task is incomplete to the user computing device to prompt the user to complete the task via the user computing device.

2. The computer-implemented method of claim 1, wherein determining the effect of the completion of the task on the account further comprises:

predicting an interaction associated with the account that will occur within a time period relevant to the completion of the task based on the information; and determining the effect of the completion of the task further based on the interaction predicted.

3. The computer-implemented method of claim 1, wherein receiving the inactivity indication for the session comprises:

receiving the inactivity indication in response to the user computing device detecting an event indicating a lack of user activity with an application used to establish the session on the user computing device or an event indicating a user activity associated with discontinuing use of the application.

4. The computer-implemented method of claim 3, wherein the event includes a manual selection to log out of the session via the application, a lack of activity associated with the application for a threshold period of time, the application losing focus, or a closing of the application.

5. The computer-implemented method of claim 3, wherein the inactivity indication is received in response to the user computing device detecting a period of time associated with the event is greater than a first threshold period of time and less than a second threshold period of time associated with an invalidation of the session.

6. The computer-implemented method of claim 1, wherein transmitting the notification comprises:

determining a communication channel for transmission of the notification that increases a likelihood of notification engagement to prompt task completion; and transmitting the notification via the communication channel.

7. The computer-implemented method of claim 6, wherein the user computing device is a first user computing device, and the communication channel is at least one of a push notification of an application used to establish the session on the user computing device, an electronic mail, a text message, an instant message, or a phone call to at least one of the first user computing device or a second user computing device.

8. The computer-implemented method of claim 1, wherein the notification is a second notification, and the method further comprises:

prior to receiving the inactivity indication for the session, identifying, from the plurality of tasks, the task that is incomplete based on the task status; and generating a first notification indicating the task is incomplete to the user computing device to prompt task completion.

9. The computer-implemented method of claim 8, wherein the first notification prompted the establishment of the session on the user computing device.

10. The computer-implemented method of claim 1, wherein monitoring the task status of the plurality of tasks comprises monitoring the task status in response to the session being established.

11. The computer-implemented method of claim 1, further comprising:

in response to detecting the completion of the task, updating the task status for the task to indicate the task is completed.

12. The computer-implemented method of claim 1, further comprising:

maintaining the task status of the plurality of tasks in association with an identifier of the account in a data store.

13. The computer-implemented method of claim 1, wherein the effect of the completion of the task on the account is a first effect, and determining the completion of the task is not precluded further comprises:

based on one or more previous interactions associated with the account that are identified from the information, predicting a future interaction associated with the account that will occur within a time period relevant to the completion of the task and have a second effect on the account; and determining the completion of the task is not precluded based on the first effect and the second effect.

14. A computer-implemented method for inactivity-based prompting of task completion, comprising:

monitoring a task status of a plurality of tasks related to an account associated with a user;

receiving an inactivity indication for a session established for the user on a user computing device in association with the account;

in response to receiving the inactivity indication for the session, identifying, from the plurality of tasks, a task that is incomplete based on the task status, wherein the task is of a task type;

obtaining information associated with the account;

determining an effect of a completion of the task on the account based on the information and the task type;

determining the completion of the task is precluded based on the effect; and in response to determining the completion of the task is precluded, withholding generating and transmitting a notification indicating the task is incomplete to the user computing device at least until the completion of the task is no longer precluded.

15. The computer-implemented method of claim 14, wherein determining the effect of the completion of the task on the account further comprises:

predicting an interaction associated with the account that will occur within a time period relevant to the completion of the task based on the information; and determining the effect of the completion of the task further based on the interaction predicted.

16. The computer-implemented method of claim 14, further comprising:

detecting a predefined waiting period has elapsed after determining the completion of the task is precluded;

obtaining updated information associated with the account;

determining a new effect of the completion of the task on the account based on the updated information and the task type;

determining the completion of the task is not precluded based on the new effect; and transmitting the notification indicating the task is incomplete to the user computing device.

17. The computer-implemented method of claim 16, wherein transmitting the notification comprises:

determining a communication channel for transmission of the notification that increases a likelihood of notification engagement to prompt task completion; and transmitting the notification via the communication channel.

18. The computer-implemented method of claim 14, wherein receiving the inactivity indication for the session comprises:

receiving the inactivity indication in response to the user computing device detecting an event indicating a lack of user activity with an application used to establish the session on the user computing device or an event indicating a user activity associated with discontinuing use of the application.

19. The computer-implemented method of claim 14, further comprising:

maintaining the task status of the plurality of tasks in association with an identifier of the account in a data store.

20. A computer-implemented method for inactivity-based prompting of task completion, comprising:

monitoring a task status of a plurality of tasks related to an account associated with a user;

receiving an inactivity indication for a session established for the user on a user computing device in association with the account;

in response to receiving the inactivity indication for the session, identifying, from the plurality of tasks, a task that is incomplete based on the task status, wherein the task is of a task type;

obtaining information associated with the account;

determining an effect of a completion of the task on the account based on the information and the task type;

predicting an interaction associated with the account that will occur within a time period relevant to the completion of the task based on the information;

determining the completion of the task is precluded based on a change to the effect caused by the interaction predicted; and in response to determining the completion of the task is precluded, withholding generating and transmitting a notification indicating the task is incomplete to the user computing device at least until the completion of the task is no longer precluded.

\*　\*　\*　\*　\*